(12) United States Patent
Shiau

(10) Patent No.: US 7,468,098 B2
(45) Date of Patent: Dec. 23, 2008

(54) DETACHABLE FILTERING APPARATUS FOR AN AIR CONDITIONING SYSTEM AND AN INSTALLMENT METHOD THEREOF

(75) Inventor: Yen-Kuen Shiau, Sijhih (TW)

(73) Assignee: Cargico Engineering Corp., Taipei County (TW)

( * ) Notice: Subject to any disclaimer, the term of this patent is extended or adjusted under 35 U.S.C. 154(b) by 492 days.

(21) Appl. No.: 11/283,954

(22) Filed: Nov. 22, 2005

(65) Prior Publication Data

US 2007/0113741 A1    May 24, 2007

(51) Int. Cl.
*B01D 46/00* (2006.01)
(52) U.S. Cl. .......................... 95/285; 55/385.1; 55/503; 55/504; 55/505; 55/524; 96/226
(58) Field of Classification Search .............. 55/385.1, 55/385.4, 505, 510, 503, 504, 524; 96/223, 96/226; 210/452; 215/261; 383/80, 102; 95/285
See application file for complete search history.

(56) References Cited

U.S. PATENT DOCUMENTS

| | | | | |
|---|---|---|---|---|
| 4,027,427 A * | 6/1977 | Stoller et al. | ............ | 47/1.1 |
| 5,230,430 A * | 7/1993 | Kidder | ............ | 206/484.1 |
| 5,891,223 A * | 4/1999 | Shaw et al. | ............ | 96/134 |
| 6,524,361 B1 * | 2/2003 | Thornton et al. | ............ | 55/385.4 |
| 7,066,337 B2 * | 6/2006 | Hsu | ............ | 210/452 |
| 2005/0214188 A1 * | 9/2005 | Rohrbach et al. | ............ | 423/237 |

* cited by examiner

*Primary Examiner*—Duane S Smith
*Assistant Examiner*—Minh-Chau T Pham
(74) *Attorney, Agent, or Firm*—Rosenberg, Klein & Lee

(57) ABSTRACT

A detachable filtering apparatus for an air conditioning system and an installment method thereof provides an air disinfection function. It can be operated continuously, is suitable for conventional air conditioners and is applied at a place that requires disinfection. A hollow circular frame and a multi-aperture filter screen are detachably installed at a specified installation area of the air tube of the air conditioning system. The structure of the filtering apparatus can be installed easily and conveniently and is suitable for adjustable air pipes. It is convenient to maintain the air conditioner.

17 Claims, 11 Drawing Sheets

DETACHABLE FILTERING APPARATUS FOR AN AIR CONDITIONING SYSTEM AND AN INSTALLMENT METHOD THEREOF

BACKGROUND OF THE INVENTION

1. Field of the Invention

The present invention relates to a detachable filtering apparatus for an air conditioning system and an installment method thereof. A hollow circular frame and a multi-aperture filter screen are installed at a specified installation area of the air tube of the air conditioning system. The effect is better than the results of the prior art of cleaning the air by using drugs.

2. Description of the Related Art

In the food industry, an aseptic environment is an important factor. Furthermore, air-disinfection and air-purification are the most important goals for an air conditioning system. The methods include producing ozone, negative ions and photocatalyst bactericidal material etc. An air-conditioning system is suitable for industrial factories, commercial buildings and homes and disinfects the air. For example, a food factory is a place that easily propagates bacteria. Installing an air-disinfection and purification apparatus can help prevent infectious diseases from happening. Similarly, in commercial buildings, such as an exhibition market, the air easily accumulates bacteria due to the exhibition of food (especially, it is easy to injure the worker when executing a maintenance.). Installing an air-disinfection purification apparatus helps disinfect the air. In private homes, an air conditioning system has an air-disinfection and purification goal to assure the inhabitants of the house that the air they are breathing is clean and healthy. Therefore, an air-disinfection and purification apparatus is a basic technology and is necessary for the air conditioning system. The construction method is an important factor for an air conditioning system manufacturer. They focus on improving the practicality of the structure of the air-disinfecting and purification apparatus and reducing the cost of the operation.

Conventional indoor air cleaning methods, for preventing and sterilizing bacteria infections in a multi-storied building, installs a drug-spraying washing tower and a pernicious gas absorbing device at the vent of the multi-storey building. However, this method needs a middle-sized chemical barrel. While this may be suitable for a food or a chemical factory with lots of extra space, for a middle-sized or a small-sized building, it is inconvenient and needs to be improved upon.

Therefore, an air-disinfecting and purification apparatus must have powerful disinfection ability, its structure needs to be small and it must fit in with the natural principles of airflow. A convenient installation method at low cost and easily to be detached, installed and maintained is also necessary.

SUMMARY OF THE INVENTION

One particular aspect of the present invention is to provide an air cleaning apparatus that is easily detached and installed and an installation method. It is suitable for existing air conditioning systems and is cheap. The air cleaning apparatus has a filter structure having a quaternary ammonium disinfecting function. The filter structure can be applied to an air conditioning system in hospitals, industrial buildings, commercial buildings, houses and vehicles. The present invention uses a low cost quaternary ammonium material in existing air conditioning systems to reduce costs, and works well.

In order to achieve the above objects, the filter apparatus of the prevent invention includes a multi-aperture filter screen and a hollow circular frame. The multi-aperture filter screen that fits in with the hollow circular frame is embedded in the airing area of the air conditioning system. The installation method is easy and it is easily maintained. Furthermore, quaternary ammonium salt is disposed/affixed onto the multi-aperture filter screen and passes through the holes of the multi-aperture filter screen via airflow. The present invention utilizes the air convection in the inlet and outlet, or the pipes of the air conditioning system to form a filter structure for the air conditioning system having a quaternary ammonium salt disinfection function and a manufacturing method thereof.

The structure of the present invention includes a multi-aperture filter screen having a rim fixing area and a filtering area, and a hollow circular frame having an outer frame. Its size matches with the inner edge of a specified installation area of an air pipe of the air conditioning system. The hollow circular frame is installed at the specified installation area and can be detached. The center of the hollow circular frame is the air flowing area. At the filtering area there is quaternary ammonium compound that combines with the multi-aperture filter screen via chemical bonding. Alternatively, when quaternary ammonium compound is not reactive, the quaternary ammonium compound combines and attaches with the multi-aperture filter screen via an interface-linking method. The fixing area is located at the detachable hollow circular frame on the vent of the air conditioning system. The filtering area is installed on the center air flowing area of the hollow circular frame. The hollow circular frame installed with the multi-aperture filter screen is implemented by tightly pressing the rim fixing area via the outer frame, or by a pasting method, a metal screen melting connecting method or a fastener fastening method. This makes the rim fixing area joint with the hollow circular frame. The multi-aperture filter screen is installed in the detachable hollow circular frame via with a pressing method, a pasting method, a metal screen melting connecting method or a fastener fastening method. Thereby, the compound reacts with the air at the vent flows to disinfect the air. The quaternary ammonium compound attached at the filtering area reacts with the air at the vent flows to disinfect the air.

The method of the present invention includes: (1) manufacturing the multi-aperture filter screen and the hollow circular frame, and (2) installing the multi-aperture filter screen and the hollow circular frame at a specified installation area of an air pipe of the air conditioning system. When the detachable hollow circular frame installed with the multi-aperture filter screen is implemented by tightly pressing the rim fixing area via the outer frame, the rim fixing area is clipped between the specified installation area and the outer frame. When the detachable hollow circular frame installed with the multi-aperture filter screen is implemented by a pasting method, a metal screen melting connecting method or a fastener fastening method, it makes the rim fixing area joint with the hollow circular frame, so the rim fixing area is fastened at the outer frame. Then, the outer frame is installed at the specified installation area.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
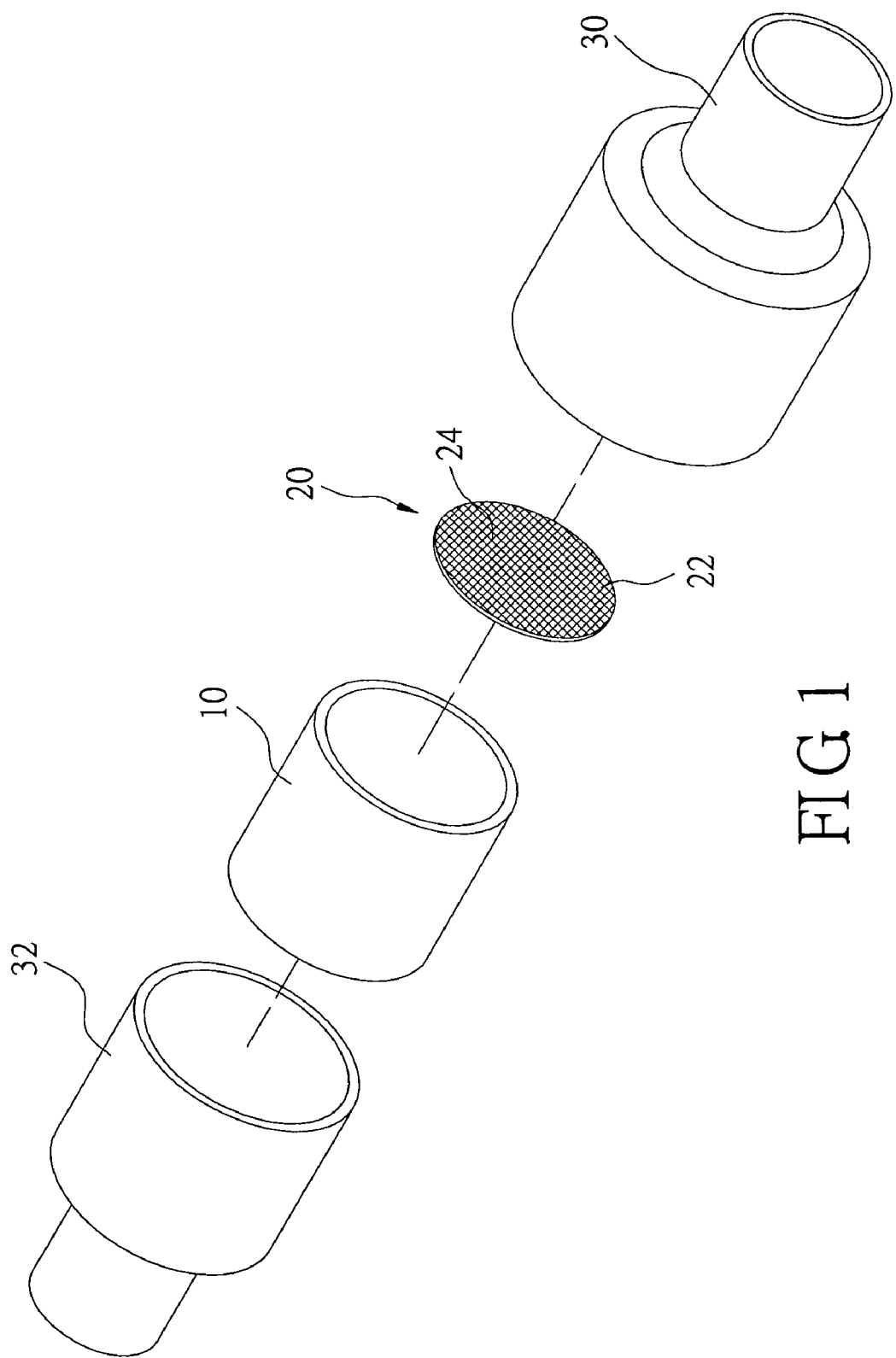
FIG. 1 is a schematic diagram of the installation structure of the specified installation area of a circular air tube of an embodiment of the present invention.
Figure 2A:
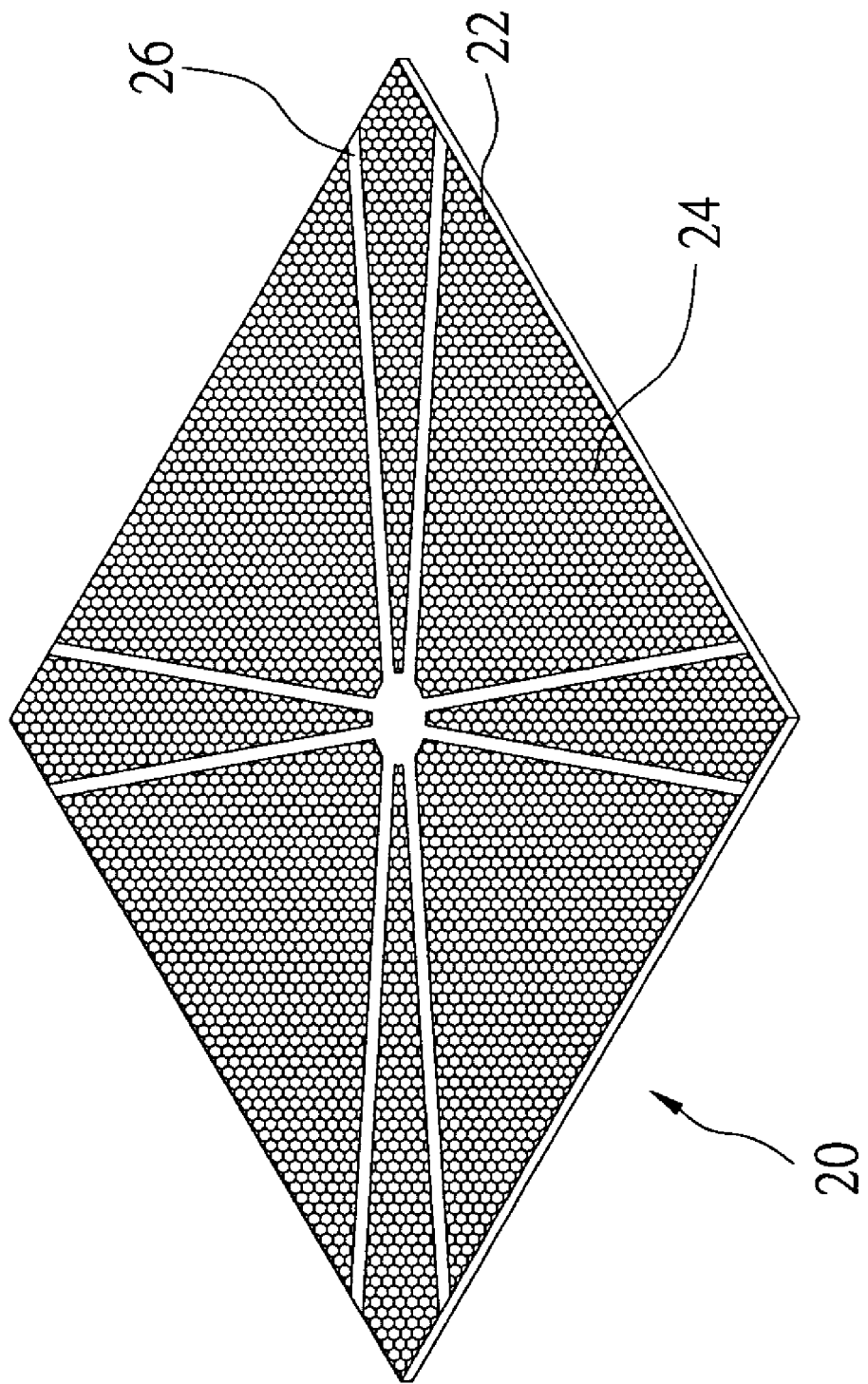
FIG. 2A is a schematic diagram of a first structure of the square-shaped multi-aperture filter screen of an embodiment of the present invention.
Figure 2B:
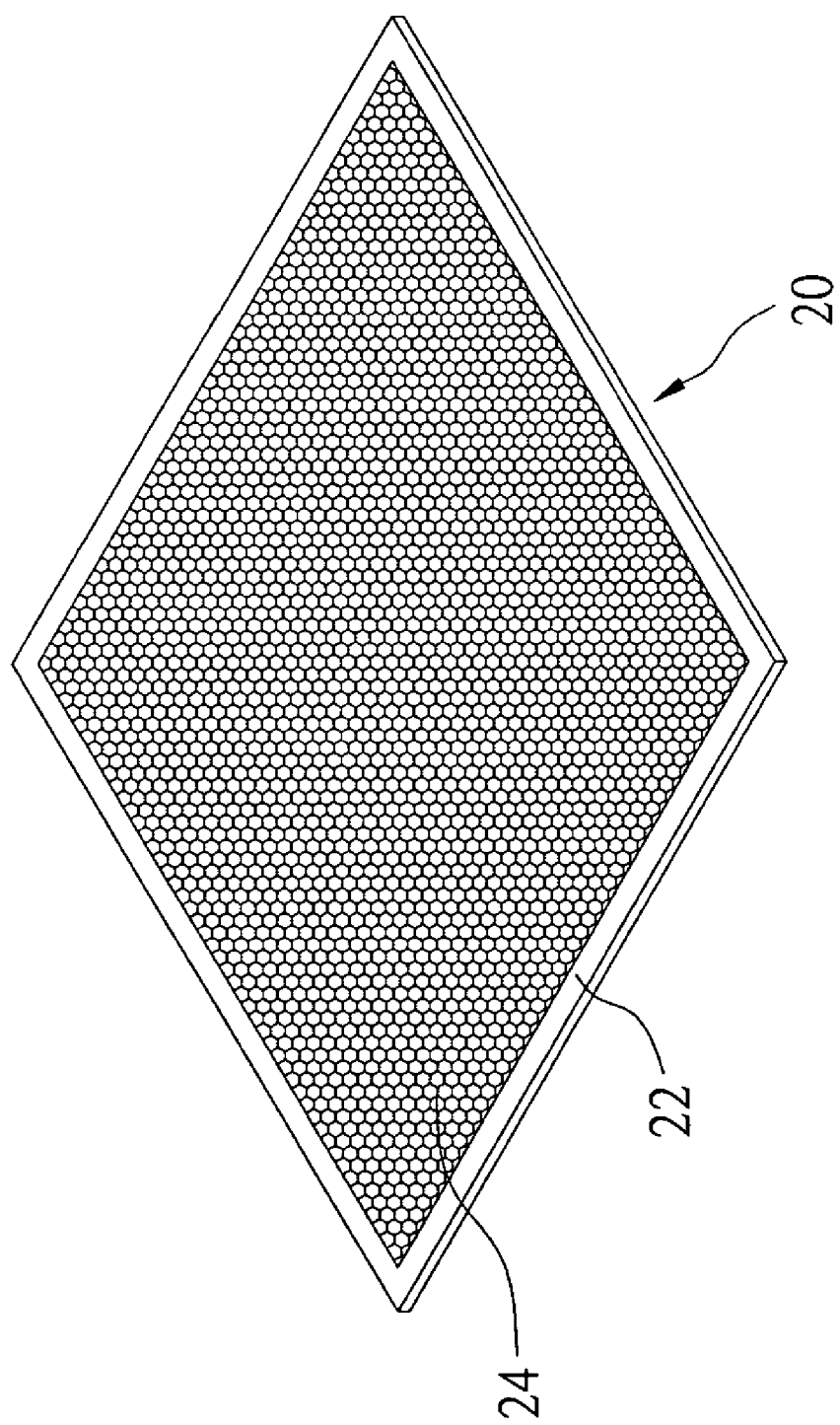
FIG. 2B is a schematic diagram of a second structure of the square-shaped multi-aperture filter screen of an embodiment of the present invention.
Figure 2C:
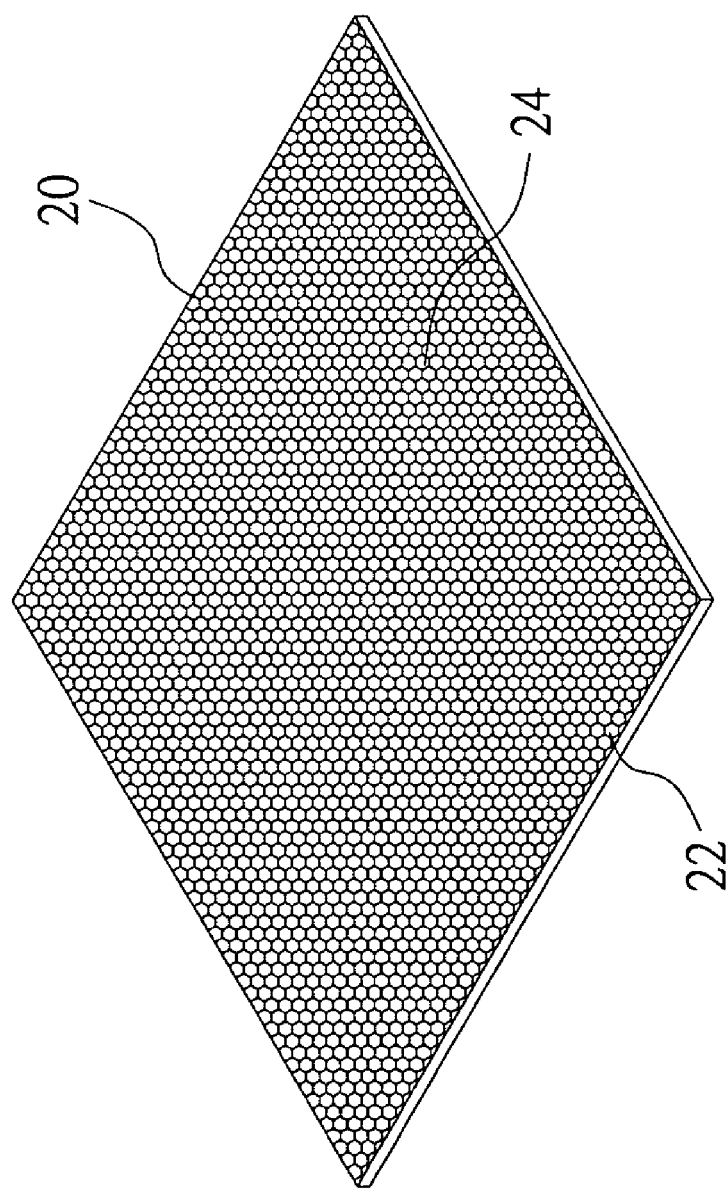
FIG. 2C is a schematic diagram of a third structure of the square-shaped multi-aperture filter screen of an embodiment of the present invention.
Figure 2D:
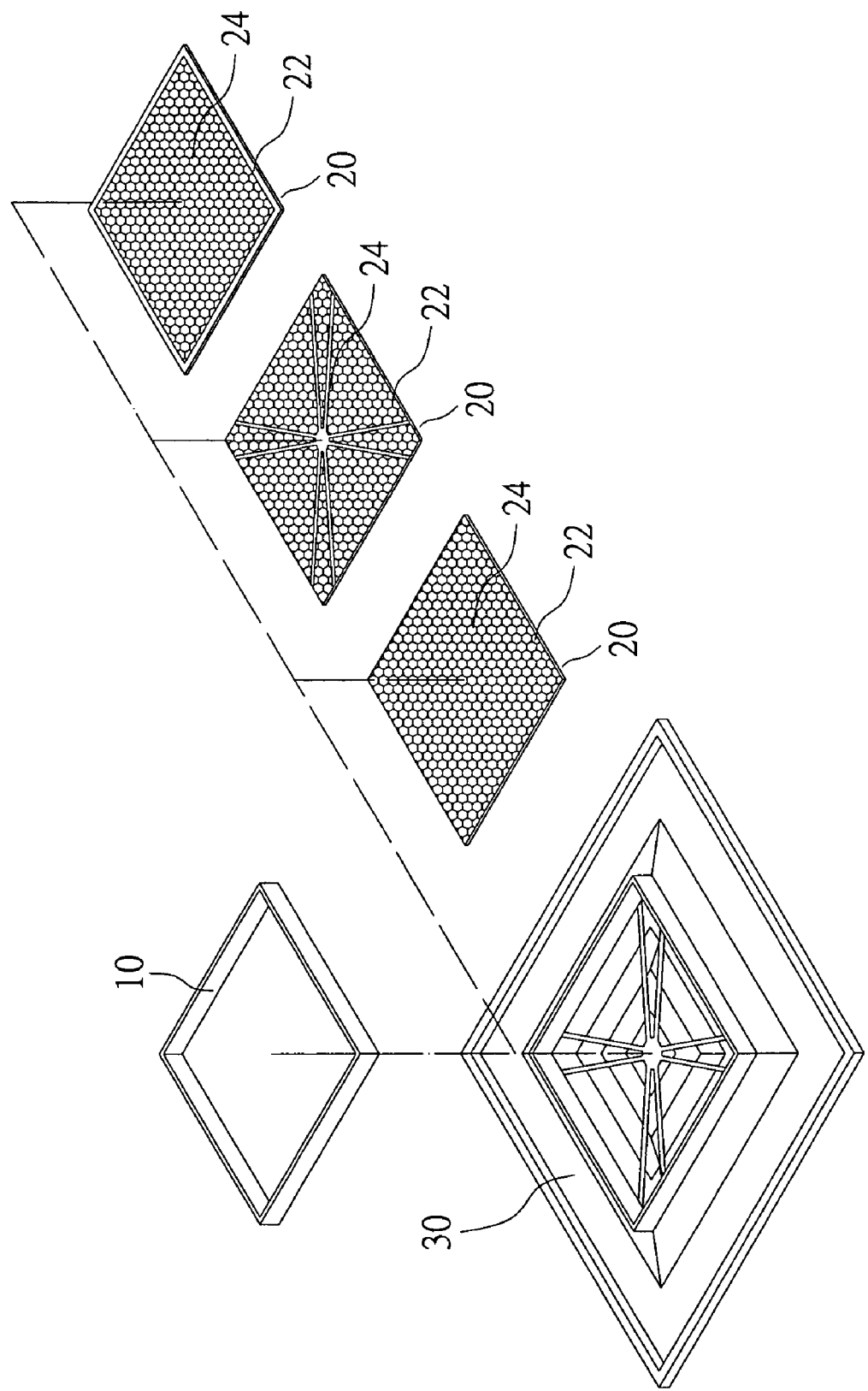
FIG. 2D is a schematic diagram of a structure of the square-shaped hollow circular frame fitting in with the multi-aperture filter screen of an embodiment of the present invention.
Figure 3A:
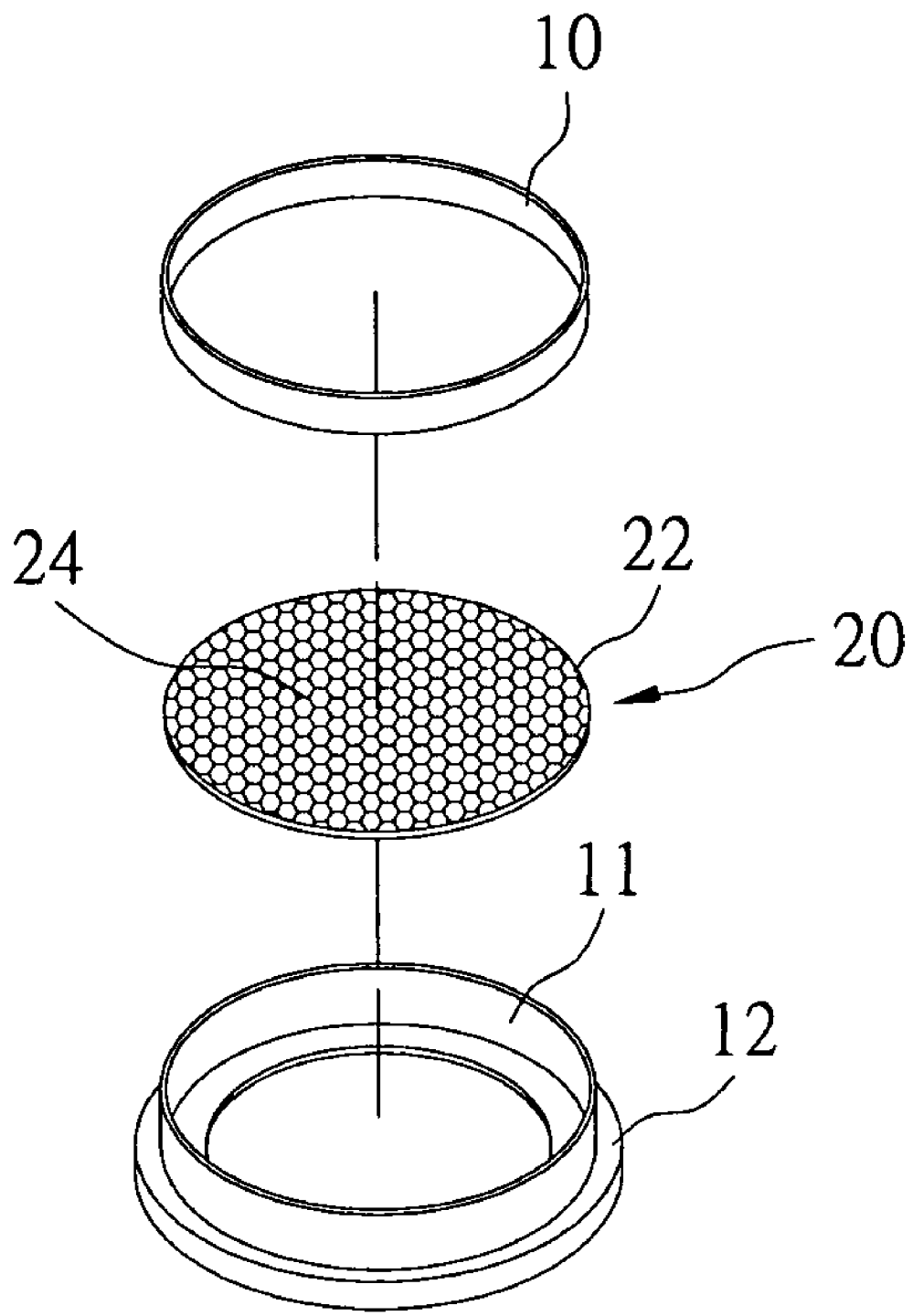
FIG. 3A is a schematic diagram of a structure of the circular-shaped hollow circular frame fitting in with the multi-aperture filter screen of an embodiment of the present invention.
Figure 3B:
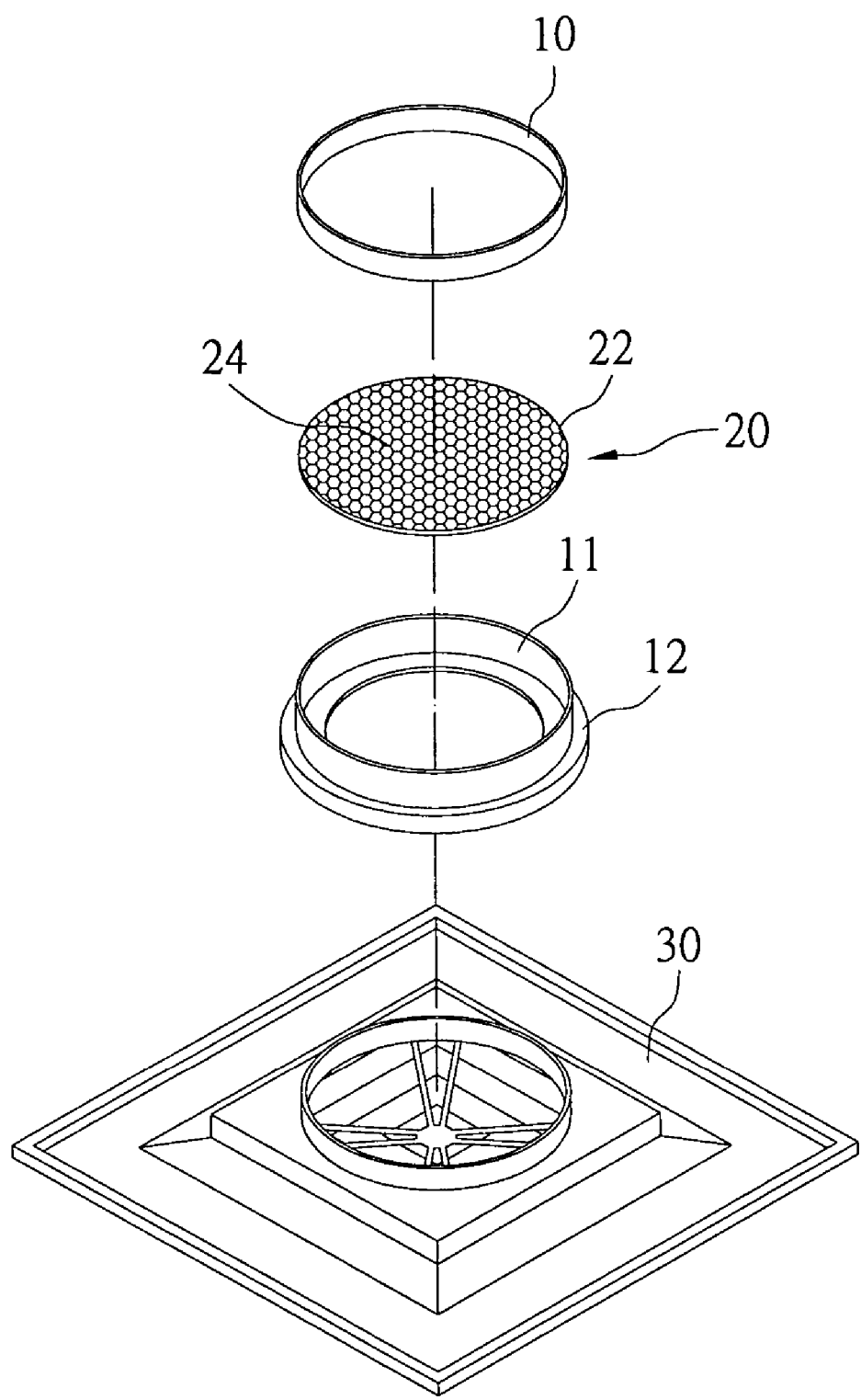
FIG. 3B is a schematic diagram of a structure of the specified installation area of the circular-shaped hollow circular frame fitting in with the multi-aperture filter screen of an embodiment of the present invention.
Figure 4A:
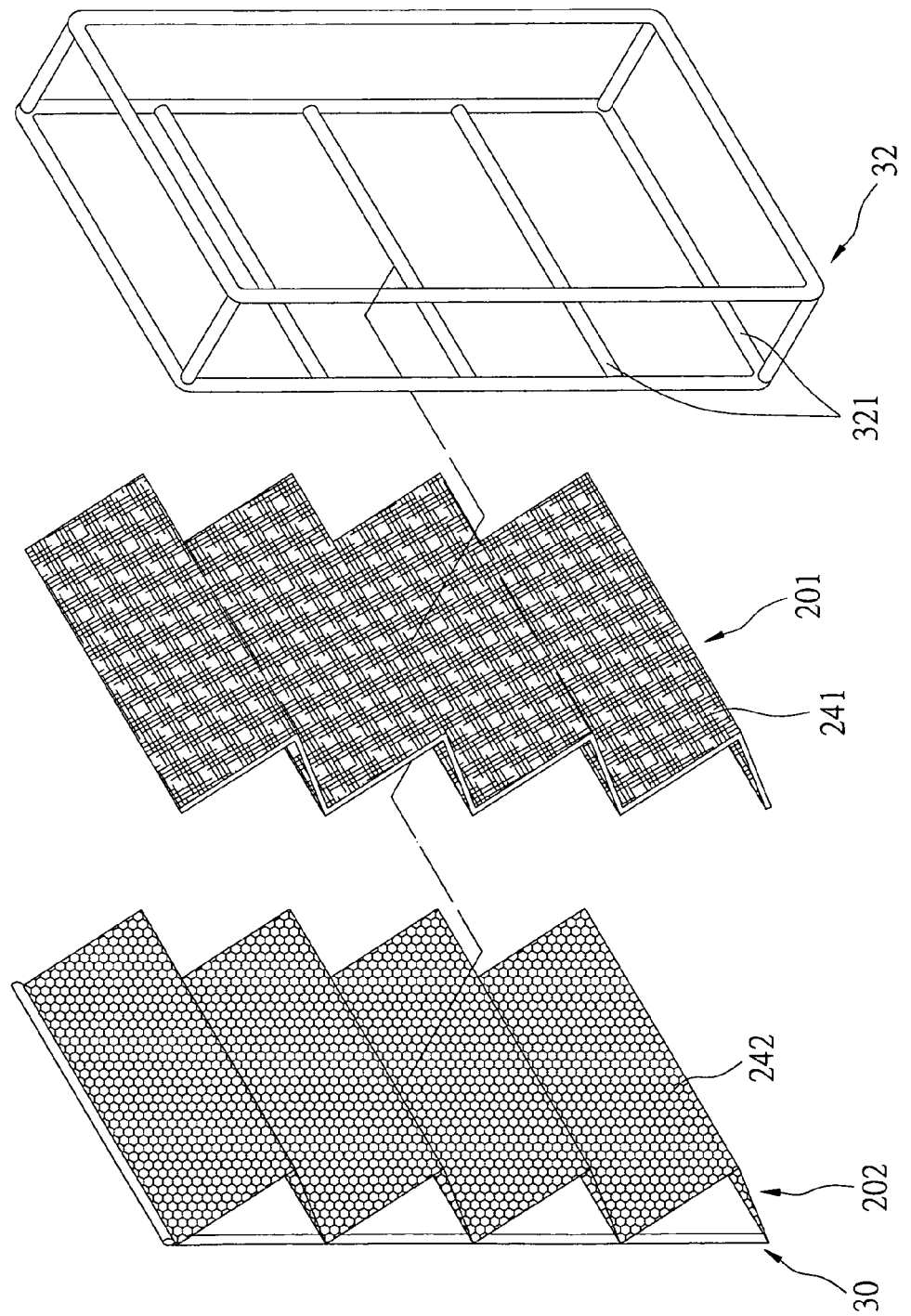
FIG. 4A is a schematic diagram of a first structure of the multi-aperture filter screen with a cotton screen and an iron screen of an embodiment of the present invention.
Figure 4B:
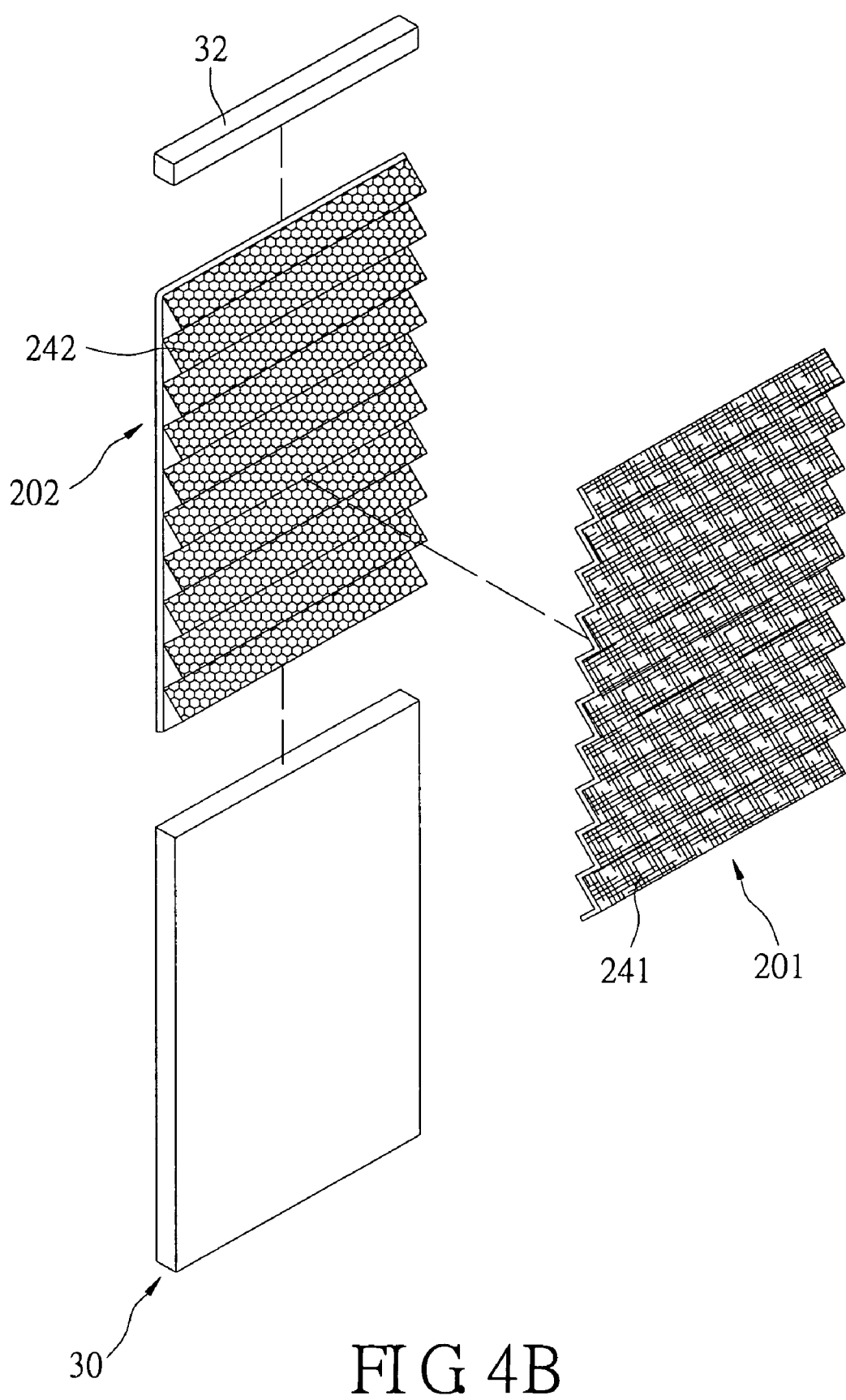
FIG. 4B is a schematic diagram of a second structure of the multi-aperture filter screen with a cotton screen and an iron screen of an embodiment of the present invention.
Figure 4C:
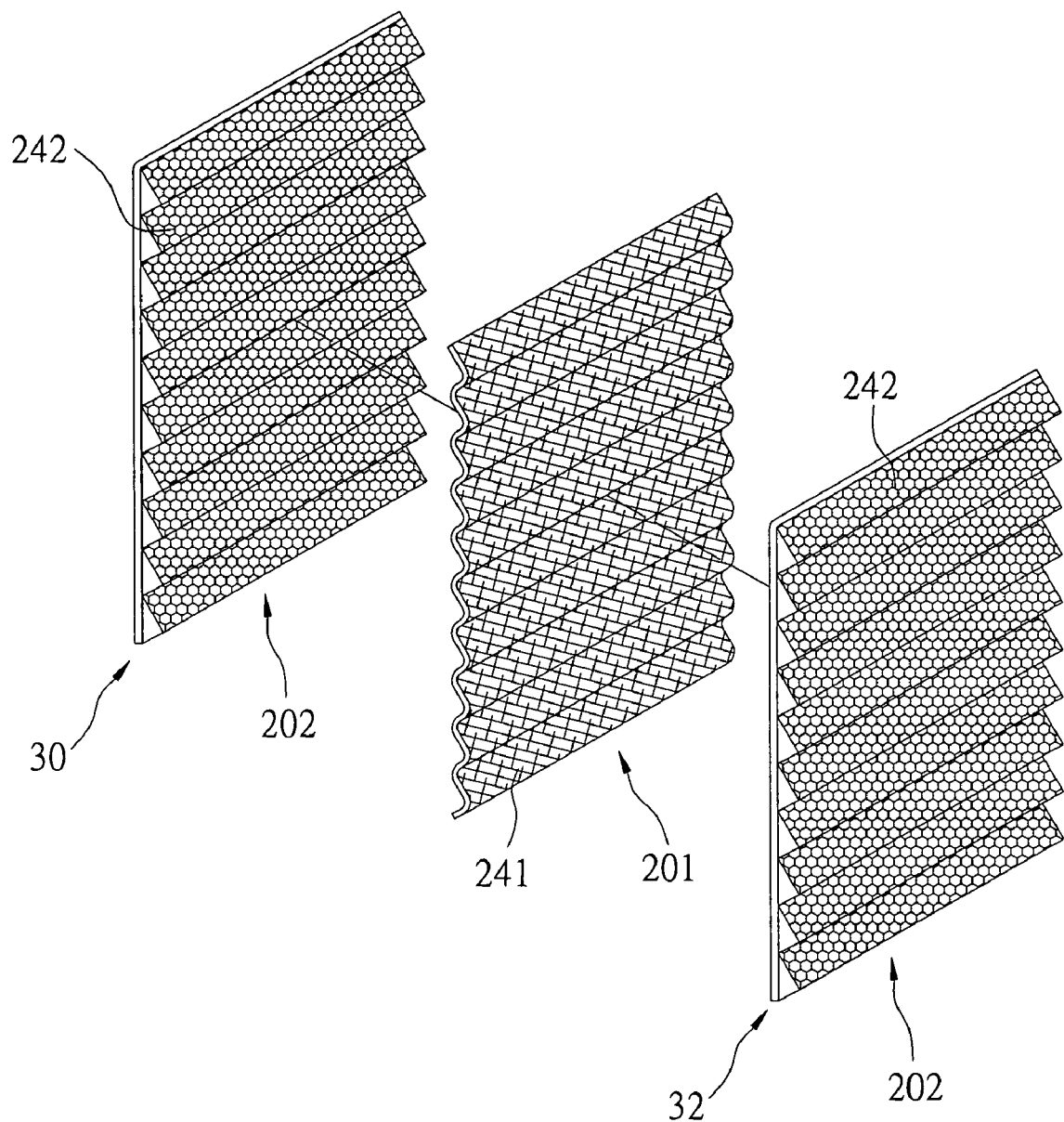
FIG. 4C is a schematic diagram of a third structure of the multi-aperture filter screen with a cotton screen and an iron screen of an embodiment of the present invention.
Figure 4D:
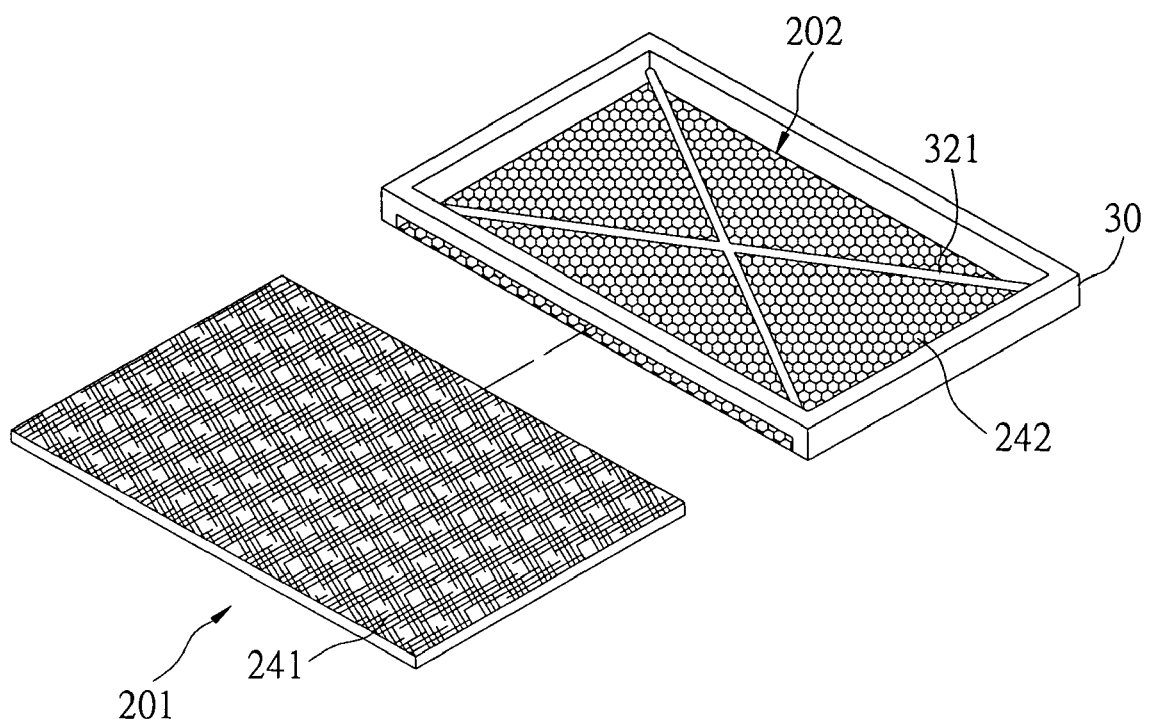
FIG. 4D is a schematic diagram of a fourth structure of the multi-aperture filter screen with a cotton screen and an iron screen of an embodiment of the present invention.

Please refer to FIGS. 1, 2D and 3B, which show an exploded view of an embodiment of the present invention. Please refer to FIGS. 2A, 2B and 2C, which show three structures of the square-shaped multi-aperture filter screen of the present invention. Please also refer to FIG. 3A, which shows a part combination view of an embodiment of the present invention. At a specified air flowing area of an air tube of an air conditioning system there is a multi-aperture filter screen 20 having a rim fixing area 22 and a filtering area 24, and a hollow circular frame 10 (the hollow circular frame 10 in FIG. 1 is pasted with the multi-aperture filter screen 20, then an installment fitting part 32 is placed for being installed at a specified installation area 30) having an outer frame which size matches the inner edge of the specified installation area 30 of an air pipe of the air conditioning system. The hollow circular frame 10 is installed at the specified installation area 30. (The hollow circular frame 10 in FIG. 3A is placed into a fitting ring 11 and is installed at the specified installation area 30 and can be detached via a fitting ring base 12.) The center of the hollow circular frame 10 is the air flowing area. At the filtering area 24 there is quaternary ammonium compound that combines with the multi-aperture filter screen 20 via chemical bonding, or when the quaternary ammonium compound isn't reactive, the quaternary ammonium compound combines and attaches with the multi-aperture filter screen 20 by an interface-linking method. The fixing area 22 is located at the detachable hollow circular frame 10 on the vent of the air conditioning system. The filtering area 24 is installed on the center air flowing area of the hollow circular frame 10. The hollow circular frame 10 installed with the multi-aperture filter screen 20 is implemented by tightly pressing the rim fixing area 22 via the outer frame, or by a pasting method, a metal screen melting connecting method or a fastener fastening method, and makes the rim fixing area 22 joint with the hollow circular frame 10. The multi-aperture filter screen 20 is installed in the detachable hollow circular frame 10 via with a pressing method, a pasting method, a metal screen melting connecting method or a fastener fastening method. Thereby, the compound reacts with the air at the vent flows to disinfect the air. The quaternary ammonium compound attached at the filtering area reacts with the air at the vent flows to disinfect the air. Then, via the inner air pressure difference inside the air conditioning pipe, the air disinfecting process continuously takes place.

Please refer to FIGS. 4A, 4B, 4C and 4D, which show four structures of the multi-aperture filter screen with a cotton screen and an iron screen of an embodiment of the present invention. At a specified air flowing area of an air tube of an air conditioning system there is a multi-aperture filter screen 20 (including a weaved-type multi-aperture filter screen 201 and a metal-screen-type multi-aperture filter screen 202). The weaved-type multi-aperture filter screen 201 can be a cotton or weaving-cloth filter screen and there can be either one or more than one. The metal-screen-type multi-aperture filter screen 202 is made of metal or wire mesh of different sizes and there can be either one or more than one. The filtering area 24 is fastened via an installment-pressing batten 321. The weaved-type filtering area 241 and a metal-screen-type filtering area 242 individually execute a fine filtering and a coarse filtering. The filtering screen 20 in FIGS. 4A, 4B, 4C and 4D can be plane-shaped or folding-shaped. The specified installation area 30 and the installment fitting part 32 have an outer frame whose size matches with the inner edge of a specified installation area 30 of an air pipe of the air conditioning system. The installment fitting part 32 is installed at the specified installation area 30 and can be detached. The center of the filtering area 24 is an air flowing area. At the filtering area 24 there is quaternary ammonium compound combines with the multi-aperture filter screen 20 via chemical bonding, or when the quaternary ammonium compound isn't reactive, the quaternary ammonium compound combines and attaches with the multi-aperture filter screen 20 by an interface-linking method. The fixing area 22 is located at the detachable hollow circular frame 10 on the vent of the air conditioning system. The filtering area 24 is installed on the center air flowing area of the hollow circular frame 10. The specified installation area 30 installed with the multi-aperture filter screen 20 is implemented by tightly pressing the filtering area 24 via the installment-pressing batten 321, or by a pasting method, a metal screen melting connecting method or a fastener fastening method, and makes the filtering area 24 joint with the frame of the specified installation area 30 or the installment fitting part 32. The weaved-type filtering area 241 is installed via the pressing method and the metal-screen-type filtering area 242 is installed via the metal screen melting connecting method or the fastener fastening method.

The multi-aperture filter screen 20 is installed in the detachable installation fitting part 32 via with a pressing method, a pasting method, a metal screen melting connecting method or a fastener fastening method. Thereby, the compound reacts with the air at the vent flows to disinfect the air. The quaternary ammonium compound attached at the filtering area reacts with the air at the vent flows to disinfect the air.

Then, via the inner air pressure difference inside the air conditioning pipe, the air disinfecting process continuously takes place.

A method of manufacturing a multi-aperture filter screen 20 for an air conditioning system of the present invention is described. Firstly, a quaternary ammonium salt liquid is manufactured. The quaternary ammonium salt is mixed with water for dilution, and is stirred and dissolved. To create a non-reactive solution, an interface-linking agent should be added. A multi-aperture carrier is soaked in the quaternary ammonium salt liquid. Then, the multi-apertures carrier is removed, and an attaching and drying procedure is performed at temperatures between 30° C. and 120° C. (between 60 and 80° C. is the most effective) for between 3 and 30 minutes. Alternatively, the quaternary ammonium salt liquid is sprayed onto the multi-apertures carrier and the attaching and drying procedure is performed at the same temperature and for the same amount of time as described above.

The air conditioning apparatus can be disposed at an opening of a central air conditioning system, a dehumidifier or an air conditioner. Furthermore, it can also be installed in vehicles, such as the vents of air conditioners on trains, buses, airplanes or ships.

When the multi-aperture filter screen 20 has glass fiber components, the glass fiber reacts with a reactive silicon-alkyl quaternary ammonium salt to form an O—Si—O covalent bond. This solution is extremely uneasy to remove. The fiber material is HEPA or ULPA (an ultra particulate air filter). Alternatively, an uncreative quaternary ammonium salt adds an interface-linking agent that combines with and attaches onto the fiber. Therefore, the quaternary ammonium salt cannot be washed away when the air conditioning system is cleaned.

Because the present invention disposes quaternary ammonium salt on the multi-aperture filter screen 20 and installs it at the vent of the air conditioner, it utilizes the circulation of the air at the vent to disinfect the air via the quaternary ammonium salt and continues to take place. Therefore, the air conditioning system disinfects the air.

The method of the present invention includes: (1) manufacturing the multi-aperture filter screen 20 and the hollow circular frame 10, and (2) installing the multi-aperture filter screen 20 and the hollow circular frame 10 at a specified installation area 30 of an air pipe of the air conditioning system. When the detachable hollow circular frame 10 installed with the multi-aperture filter screen 20 is implemented by tightly pressing the rim fixing area 22 via the outer frame, the rim fixing area 22 is clipped between the specified installation area 30 and the outer frame. When the detachable hollow circular frame 10 installed with the multi-aperture filter screen 20 is implemented by a pasting method, a metal screen melting connecting method or a fastener fastening method, it makes the rim fixing area 22 joint with the hollow circular frame 10, so the rim fixing area 22 is fastened at the outer frame. Then, the outer frame is installed at the specified installation area 30.

The method of the present invention (the installment method as shown in FIGS. 4A~4D) includes: (1) manufacturing the multi-aperture filter screen 20 and the installment fitting part 32, and (2) installing the multi-aperture filter screen 20 and the installment fitting part 32 at a specified installation area 30 of an air pipe of the air conditioning system. When the detachable installment fitting part 32 installed with the multi-aperture filter screen 20 is implemented by tightly pressing the filtering area 24, or by a pasting method, a metal screen melting connecting method, or a fastener fastening method, it makes the filtering area 24 joint with the frame of the specified installation area 30 or the installment fitting part 32. When the multi-aperture filter screen 20 is installed, the filtering area 24 is clipped between the specified installation area 30 and the installment fitting part 32. The installment fitting part 32 is a frame having an installment-pressing batten 321 or an installment-pressing batten 321 that can be installed at the specified installation area 30.

The other embodiments are described as follows. The filtering area 24 of the multi-aperture filter screen 20 is attached with nano-sized gold or silver pellets. The nano-sized gold or silver pellets are manufactured by chemical evaporation and plating, or are reduced by cationization included in the filtering area 24 of the multi-aperture filter screen 20 absorbing the ionic gold or the ionic silver. The shape of the hollow circular frame 10 is square or circular. The hollow circular frame 10 can be a cross-section column tube-shaped air pipe. The multi-aperture filter screen 20 is manufactured by fiber weaving, foaming forming, or metal screen weaving. The fiber has a glass fiber component. The fiber material is HEPA or ULPA. Furthermore, the multi-aperture filter screen 20 combines with the reactive quaternary ammonium salt by chemical bonding, it also can combine with the non-reactive quaternary ammonium salt by an interface-linking method. Therefore, the quaternary ammonium salt cannot be removed when the air conditioning system is cleaned. When the specified installation area 30 is installed at a light shining area, the filtering area 24 of the multi-aperture filter screen 20 is attached with photocatalyst nano-sized pellets. The photocatalyst nano-sized pellets are manufactured by soaking the filter screen with the titania solution and then being dried. Alternatively, the photocatalyst nano-sized pellets are manufactured by spraying the titania solution onto the filter screen.

The present invention has the following characteristics:

1. It is easy to install, requiring less manpower.

2. The size is small. Therefore, it can be installed conveniently.

3. It can be used for a conventional air conditioner.

4. It has the same shape as a conventional air pipe.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A detachable filtering apparatus for an air conditioning system, comprising:

a multi-aperture filter screen, having a rim fixing area and a filtering area; and a hollow circular frame fixedly coupled to said multi-aperture rim of said multi-aperture screen, said hollow circular frame having an outer frame whose size matches the inner edge of a specified installation cross sectional area of an air pipe of the air conditioning system; wherein the hollow circular frame is detachably installed at the specified installation cross sectional area and the center of the hollow circular frame is the air flowing area;

wherein at the filtering area there is quaternary ammonium compound deposited on with the multi-aperture filter screen via chemical bonding, or when the quaternary ammonium compound is not reactive, the quaternary ammonium compound combines and attaches with the multi-aperture filter screen by an interface-linking method;

wherein the fixing area is located at the detachable hollow circular frame at the vent of the air conditioning system, and the filtering area is installed on the center air flowing area of the hollow circular frame;

wherein the hollow circular frame installed with the multi-aperture filter screen is implemented by tightly pressing the rim fixing area via the outer frame, or by a pasting method, a metal screen melting connecting method or a fastener fastening method, making the rim fixing area join with the hollow circular frame;

wherein the detachable hollow circular frame installs the multi-aperture filter screen with a pressing method, a pasting method, a metal screen melting connecting method or a fastener fastening method, the compound reacts and the air at the vent flows to disinfect the air;

wherein the quaternary ammonium compound attached at the filtering area reacts and the air at the vent flows to disinfect the air.

2. The detachable filtering apparatus for an air conditioning system as claimed in claim 1, wherein the filtering area of the multi-aperture filter screen is attached with nano-sized gold or silver pellets, and the nano-sized gold or silver pellets are manufactured by chemical evaporation and plating, or are reduced by cationization included in the filtering area of the multi-aperture filter screen absorbing the ionic gold or the ionic silver.

3. The detachable filtering apparatus for an air conditioning system as claimed in claim 1, wherein the shape of the hollow circular frame is square or circular.

4. The detachable filtering apparatus for an air conditioning system as claimed in claim 1, wherein the hollow circular frame is a cross-section colunm tube-shaped air pipe.

5. The detachable filtering apparatus for an air conditioning system as claimed in claim 1, wherein the multi-aperture filter screen is manufactured by a fiber weaving method, a foaming forming method, or a metal screen weaving method.

6. The detachable filtering apparatus for an air conditioning system as claimed in claim 5, wherein the fiber includes a glass fiber component.

7. The detachable filtering apparatus for an air conditioning system as claimed in claim 5, wherein the fiber material is HEPA or ULPA.

8. The detachable filtering apparatus for an air conditioning system as claimed in claim 5, wherein the multi-aperture filter screen further combines with the quaternary ammonium compound via chemical bonding, and the multi-aperture filter screen combines and attaches with an uncreative quaternary ammonium salt via an interface-linking method, therefore the quaternary ammonium salt cannot be washed away when the air conditioning system is cleaned.

9. The detachable filtering apparatus for an air conditioning system as claimed in claim 1, wherein when the specified installation cross sectional area is installed at a light shining area, the filtering area of the multi-aperture filter screen is attached with photocatalyst nano-sized pellets, and the photocatalyst nano-sized pellets are manufactured by soaking the filter screen with the titania solution and then being dried, or the photocatalyst nano-sized pellets are manufactured by spraying the titania solution onto the filter screen.

10. A method of installing detachable filtering apparatus for an air conditioning system, comprising:

manufacturing the multi-aperture filter screen and the hollow circular frame;

coupling a multi-aperture rim of said multi-aperture filter screen to said hollow circular frame;

installing the multi-aperture filter screen and the hollow circular frame at a specified installation cross sectional area of an air pipe of the air conditioning system;

wherein the detachable hollow circular frame installed with the multi-aperture filter screen is implemented by tightly pressing the rim fixing area via the outer frame, and the rim fixing area is clipped between the specified installation area and the outer frame;

wherein the detachable hollow circular frame installed with the multi-aperture filter screen is implemented by a pasting method, a metal screen melting connecting method or a fastener fastening method, making the rim fixing area join with the hollow circular frame, therefore the rim fixing area is fastened at the outer frame and then the outer frame is installed at the specified installation area.

11. A detachable filtering apparatus for an air conditioning system, comprising:

a multi-aperture filter screen, having a weaved multi-aperture filter screen and a metal-screened multi-aperture filter screen that have a weaved filtering area and a metal-screened filtering area, wherein the center of the multi-aperture filter screen is an air flowing area;

an installment fitting part, having an outer frame whose size matches with the inner edge of a specified installation cross sectional area of an air pipe of the air conditioning system, wherein the installment fitting part is detachably installed at the specified installation area;

wherein the quaternary ammonium compound at the filtering area is deposited on the multi-aperture filter screen via chemical bonding, or when the quaternary ammonium compound is not reactive, the quaternary ammonium compound combines and attaches with the multi-aperture filter screen by an interface-linking method;

wherein the detachable installment fitting part installed with the multi-aperture filter screen is implemented by tightly pressing the filtering area, or by a pasting method, a metal screen melting connecting method or a fastener fastening method, making the filtering area join with the specified installation area or the installment fitting part;

wherein installing the multi-aperture filter screen is implemented by a pasting method, a metal screen melting connecting method or a fastener fastening method, making the specified installation area join with the installment fitting part;

wherein the installment fitting part is a frame having an installment-pressing batten or an installment-pressing batten that can be installed at the specified installation area.

12. The detachable filtering apparatus for an air conditioning system as claimed in claim 11, wherein the filtering area of the multi-aperture filter screen is attached with nano-sized gold or silver pellets, and the nano-sized gold or silver pellets are manufactured by chemical evaporation and plating, or are reduced by cationization included in the filtering area of the multi-aperture filter screen absorbing the ionic gold or the ionic silver.

13. The detachable filtering apparatus for an air conditioning system as claimed in claim 11, wherein the fiber material is HEPA or ULPA.

14. The detachable filtering apparatus for an air conditioning system as claimed in claim 11, wherein the multi-aperture filter screen further combines with the quaternary ammonium compound via chemical bonding, the multi-aperture filter screen combines and attaches with an uncreative type quaternary ammonium salt via an interface-linking method, therefore the quaternary ammonium salt cannot be washed away when the air conditioning system is cleaned.

15. The detachable filtering apparatus for an air conditioning system as claimed in claim 11, wherein when the specified installation cross sectional area is installed at a light shining area, the filtering area of the multi-aperture filter screen is attached with photocatalyst nano-sized pellets, and the photocatalyst nano-sized pellets are manufactured by soaking the filter screen with the titania solution and then being dried, or the photocatalyst nano-sized pellets are manufactured by spraying the titania solution onto the filter screen.

16. The detachable filtering apparatus for an air conditioning system as claimed in claim 11, wherein the weaved multi-aperture filter screen is a cotton or weaving-cloth filter screen of which there can be either one or more than one, and the metal-screened multi-aperture filter screen is made of metal or wire mesh of a different size to that of the weaved multi-aperture filter screen and of which there can be either one or more than one.

17. A method of installing detachable filtering apparatus for an air conditioning system, installing the detachable filtering apparatus in an air conditioning system as claimed in claim 11, comprising:

manufacturing a multi-aperture filter screen and an installment fitting part; and installing the multi-aperture filter screen and the installment fitting part at a specified installation cross sectional area of an air pipe of the air conditioning system;

wherein the detachable installment fitting part installed with the multi-aperture filter screen is implemented by tightly pressing the filtering area, or a pasting method, a metal screen melting connecting method or a fastener fastening method, making the filtering area of the multi-aperture filter screen join with the frame of specified installation area or the installment fitting part;

wherein when the multi-aperture filter screen is installed, the filtering area is clipped between the specified installation area and the installment fitting part;

wherein the installment fitting part is a frame having an installment-pressing batten or an installment-pressing batten that can be installed at the specified installation area.

* * * * *